(12) United States Patent
Bodapati et al.

(10) Patent No.: US 11,741,168 B1
(45) Date of Patent: Aug. 29, 2023

(54) MULTI-LABEL DOCUMENT CLASSIFICATION FOR DOCUMENTS FROM DISJOINT CLASS SETS

(71) Applicant: Amazon Technologies, Inc., Seattle, WA (US)

(72) Inventors: Sravan Babu Bodapati, Bellevue, WA (US); Rishita Rajal Anubhai, Seattle, WA (US); Yahor Pushkin, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 846 days.

(21) Appl. No.: 16/588,595

(22) Filed: Sep. 30, 2019

(51) Int. Cl.
*G06F 16/93* (2019.01)
*G06N 5/04* (2023.01)
*G06N 20/00* (2019.01)

(52) U.S. Cl.
CPC .............. *G06F 16/93* (2019.01); *G06N 5/04* (2013.01); *G06N 20/00* (2019.01)

(58) Field of Classification Search
CPC ............ G06F 16/93; G06N 20/00; G06N 5/04
USPC .......................................................... 706/12
See application file for complete search history.

(56) References Cited

U.S. PATENT DOCUMENTS

| | | | | |
|---|---|---|---|---|
| 9,477,756 | B1* | 10/2016 | Park | G06F 16/353 |
| 9,607,272 | B1* | 3/2017 | Yu et al. | G06N 20/00 |
| 2008/0086433 | A1* | 4/2008 | Schmidtler et al. | G06N 20/10 |
| | | | | 707/E17.09 |
| 2011/0302111 | A1* | 12/2011 | Chidlovskii | G06N 20/00 |
| | | | | 706/46 |
| 2014/0012849 | A1* | 1/2014 | Ulanov et al. | G06F 16/285 |
| | | | | 707/E17.046 |
| 2015/0019460 | A1* | 1/2015 | Simard et al. | G06N 20/00 |
| | | | | 706/11 |
| 2016/0140451 | A1* | 5/2016 | Li et al. | G06N 20/00 |
| | | | | 706/12 |
| 2018/0349388 | A1* | 12/2018 | Skiles et al. | G06F 16/358 |
| 2019/0325259 | A1* | 10/2019 | Murphy | G06F 18/2148 |
| 2020/0125635 | A1* | 4/2020 | Nuolf et al. | G06N 20/20 |
| 2020/0126037 | A1* | 4/2020 | Tatituri et al. | G06F 16/90335 |
| 2020/0202181 | A1* | 6/2020 | Yadav et al. | G06F 18/2411 |
| 2022/0139143 | A1* | 5/2022 | Avitan et al. | G07D 7/17 |
| | | | | 382/112 |

OTHER PUBLICATIONS

CBC_clustering_based_text_classification_requiring_minimal_labeled_data (Year: 2003).*
Fingerprints Fixed Length Representation via Deep Networks and Domain Knowledge (Year: 2019).*
Multi-Label Classification Using Higher-Order Label Clusters (Year: 2018).*
Multi-label Recommendation of Web Services with the Combination of Deep Neural Networks (Year: 2019).*

* cited by examiner

*Primary Examiner* — Gautam Ubale
(74) *Attorney, Agent, or Firm* — Nicholson De Vos; Webster & Elliott LLP

(57) ABSTRACT

Techniques for multi-label document classification are described. Clustering is used to cluster labels in a set. A machine learning model including a multi-label classifier for each cluster is created, the multi-label classifier for a given cluster to classify a document with one or more of the labels in the cluster.

18 Claims, 9 Drawing Sheets

US 11,741,168 B1

MULTI-LABEL DOCUMENT CLASSIFICATION FOR DOCUMENTS FROM DISJOINT CLASS SETS

BACKGROUND

One common computing problem is document classification. For example, a user may wish to develop a software application that can classify books as fiction or nonfiction based on back cover blurbs. More advanced software applications can classify books with multiple labels. For example, the set of labels can include drama, fiction, fantasy, nonfiction, autobiography, humor, etc., multiple of which may be applicable to a given book. The software application can classify a given book with one or more of the labels in the set.

BRIEF DESCRIPTION OF DRAWINGS

Various embodiments in accordance with the present disclosure will be described with reference to the following drawings.

DETAILED DESCRIPTION

Figure 1:
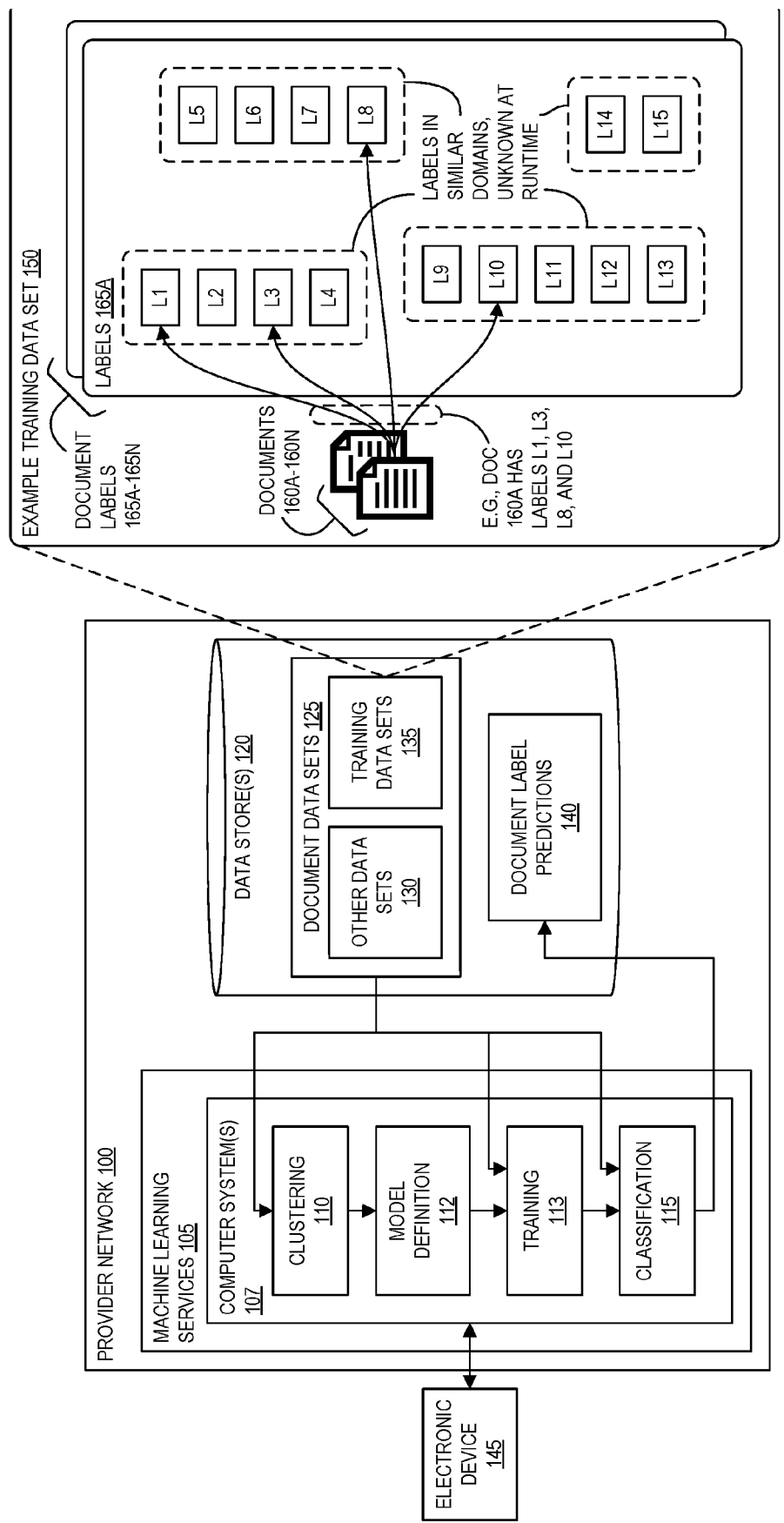
FIG. 1 is a diagram illustrating an environment for multi-label document classification according to some embodiments.

The present disclosure relates to methods, apparatus, systems, and non-transitory computer-readable storage media for multi-label document classification for documents from disjoint class sets. As used herein, the term "document" refers to a file that includes natural language (e.g., web pages, books, articles, commented source code, etc. Complex document classification problems can include document sets from dissimilar domains (as measured relative to each other) and corresponding label sets. For example, instead of a set of documents that are all of the same type (e.g., books), the set might include documents from different classes or domains (e.g., medical journal articles, Internet forum posts, online shopping product pages, etc.). Additionally, the labels relevant to one document class or domain may be irrelevant or less applicable to another type of document. For example, while labeling an online shopping page for a bicycle with the labels "bicycle" and "sports and outdoor equipment" might make sense, labeling a medical journal article with the labels "sports and outdoor equipment" and/or "bicycle" may make little sense.

Some traditional machine learning approaches for multi-label document classification might train a single classifier to label all of the documents. Such approaches can suffer from poor performance as features emphasized by the model in one document for a given label might be irrelevant to another document that should be given a different label. Other approaches might build a separate discriminative classifier for each label. For example, a first classifier might label documents as label "A" or not label "A", a second classifier might label the documents as label "B" or not label "B," and so on. Such approaches can be computationally expensive in that they require training a classifier for each label and, during inference, processing each document by each classifier.

According to some embodiments, multi-label document classification is achieved by clustering the labels into similar groups and, for each group, training a classifier to label a document with labels in that group. While groups of labels and the applicable documents can include inherent classes (or "domains") perceptible to a human user, defining those classes for a computer system is a challenging task. For example, the set of labels for documents from disjoint class sets might include "books," "online courses," "tutorials," "pants," "hats," and "shoes." A human familiar with the meaning of those labels may naturally group those labels into two subsets: one for educational materials that includes "books," "online courses," and "tutorials" and another for items of clothing that includes "pants," "hats," and "shoes." The multi-label document classification models described herein allow a computer to discover such natural groupings using clustering techniques such as k-means to "divide and conquer" the multi-label classification problem for labels in similar classes. The resulting classifiers can thus learn and rely on common features of the documents through which to apply labels. Continuing the above example, one classifier could specialize in classifying the aforementioned educational materials while another classifier could specialize in classifying the items of clothing. Additionally, the number of classifiers is reduced relative to the base case where a separate classifier is trained for each label.

FIG. 1 is a diagram illustrating an environment for multi-label document classification according to some embodiments. As illustrated, the environment includes one or more computer systems 107 to perform clustering 110, model definition 112, training 113, and classification 115 as part of creating, training, and using a multi-label document classification model as contemplated herein. The environment further includes one or more data stores 120 (e.g., virtualized storage devices backed by solid-state drives). The data store 120 includes document data sets 125 that includes training data sets 135. Individual document sets in the training data sets 135 can include documents from disjoint or unrelated classes or domains (e.g., medical journal articles, Internet forum posts, online shopping product pages, etc.). The data stores 120 can further include other data sets 130 (e.g., document sets for classification) and document label predictions 140 (e.g., the labels applied to document sets processed by a model).

At a high level, the clustering 110 process generates outputs that the model definition 112 process uses to create one or more untrained multi-label document classification models. The model(s) are trained with the training 113 process. After training, the classification 115 process can use a model to label documents in sets of documents from disjoint or unrelated classes or domains. An example training data set 150 is used to illustrate these phases. The training data set 150 includes some number N documents 160A-160N along with N sets of document labels 165A-165N, each set of document labels 165 corresponding to a document 160. The entire set of labels includes 15 different labels denoted L1 through L15, and each document 160 can be tagged with one or more of these labels. In this example, the document 160A has a set of document labels 165A indicating that the document is tagged with labels L1, L3, L8, and L10.

As illustrated, the labels L1 through L4 are grouped together, the labels L5 through L8 are grouped together, the labels L9 through L13 are grouped together, and the labels L14 and L15 are grouped together. These groupings are not present in the training data set but rather reflective of a natural relation between labels within a grouping and dissimilarity or disjointedness between labels in different groupings. For example, L1 might correspond to "pants," L2 to "hats," L3 to "shoes," and L4 to "shirts," while L5 might correspond to "books," L6 to "online courses," L7 to "tutorials," and L8 to "exams." Because these groupings are not explicitly identified in the training data set, they are unknown to the computer system 107.

By performing the clustering 110 process, the computer system 107 can identify the similarities and differences in the class sets. Based on that separation, the model definition 112 process can create model(s) having a number of classifiers corresponding to the number of different class sets. The model definition 112 process can define the model(s) using a structured format (e.g., JavaScript Object Notation, XML) or in code (e.g., Python).

In some embodiments, an optimal model is selected by creating and training a plurality of models for each potential grouping of the class sets and selecting the model with the highest performance metric. In other embodiments, an optimal grouping of the class sets is first selected by selecting that grouping using a metric that scores the groupings, and a single model corresponding to that grouping is created and trained. Additional details related to these approaches are described below. Regardless of the approach to select or train the model, the classification 115 process can process document sets using the model to perform multi-labeling.

In some embodiments, the multi-label document classification techniques described herein are offered as part of machine learning services 105 hosted by a provider network 100. The provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services, machine learning applications), access policies or roles, identity policies or roles, machine images, routers and other data processing resources, etc. These and other computing resources may be provided as services, such as a hardware virtualization service that can execute compute instances, a storage service that can store data objects, the machine learning services 105 to train and use machine learning models, etc.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code - typically without the user having any control of or knowledge of the underlying compute instance(s) involved.

The users (or "customers") of provider networks 100 may utilize one or more user accounts that are associated with a customer account, though these terms may be used somewhat interchangeably depending upon the context of use. Users may interact with a provider network 100 using an electronic device 145 in communication with the provider network 100 across one or more intermediate networks (e.g., the internet). In some embodiments, communications between the electronic device and the provider network 100 take place via one or more interface(s), such as through use of application programming interface (API) calls, via a console implemented as a website or application, etc. The interface(s) may be part of, or serve as a frontend to, a control plane of the provider network 100 that includes "backend" services supporting and enabling the services that may be more directly offered to customers.

For example, in providing multi-label document classification, the machine learning services 105 can train a model using one virtualized computer system (a "model training system") and either the same or a different virtualized computer system to host the trained model and perform tasks such as inference (a "model hosting system"). A user can submit a request a request to perform multi-label document classification task (e.g., training, inference) to the machine learning services 105, the request identifying one or more document data sets 125 in the data store(s) 120. For example, the user can identify document data sets to use for training and validation along with a request to generate a multi-label document classification model such as those described herein. The machine learning services 105 can launch a model training system on which to train the clustering 110 and classification 115 processes. After the machine learning services 105 create the model, the user can identify a document data set along with a request to perform multi-label document classification using the created model on the identified document data set. Additional details related to exemplary training and classification processes are provided below with reference to FIG. 8.

Figure 2:
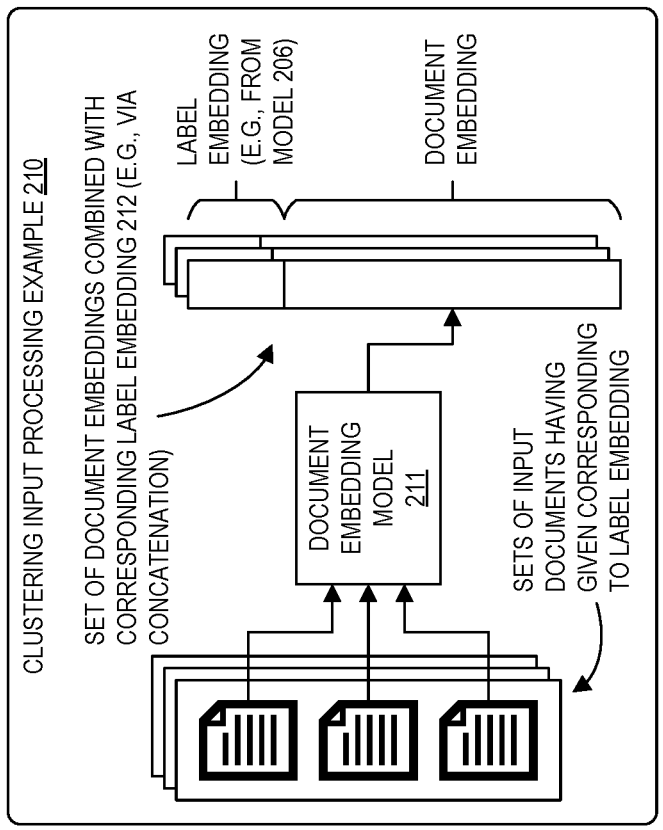
FIG. 2 illustrates examples of data preprocessing to generate inputs for label clustering according to some embodiments.
Figure 2:
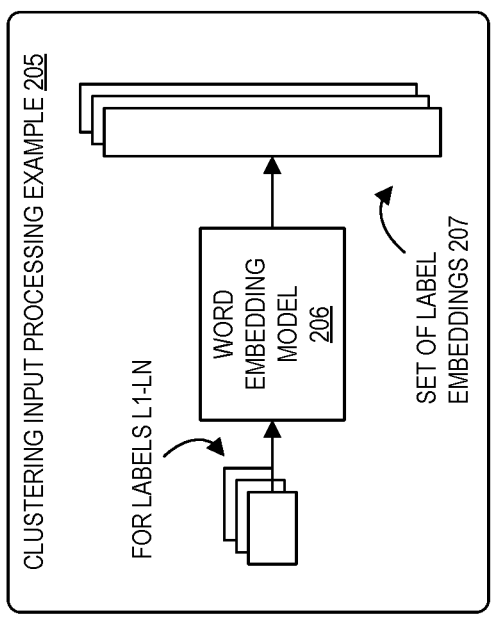

FIG. 2 illustrates examples of data preprocessing to generate inputs for label clustering according to some embodiments. The inputs to the clustering 110 process can be generated using a variety of approaches. Under one such approach conceptually illustrated in clustering input processing example 205, a word embedding model 206 can be used to convert each of the labels L1 through LN, where N is the number of labels, to corresponding label embeddings, the resulting set of label embeddings 207 corresponding to the input to the clustering 110 process (e.g., if a labeling task includes 100 labels, the clustering 110 process would cluster the 100 corresponding label embeddings). Exemplary word embedding models 206 include Word2Vec, GloVe (Global Vectors for Word Representation), and the like. The model 206 can be trained on the corpus of documents being evaluated or pre-trained on a different data set.

Under a second approach conceptually illustrated in clustering input processing example 210, label embeddings can be combined with information representing the corresponding documents, which may be helpful if the labels themselves do not contain a high degree of information (e.g., labels "One," "Two", "Three," and so on). To do so, a document embedding model is used to generate document embeddings from input documents. Exemplary document embedding models 211 include BERT (Bidirectional Encoder Representations from Transformers), averaged word embeddings from the words in a document, universal sentence encoders, and the like. The model 211 can be trained on the corpus of documents being evaluated or pre-trained on a different data set.

Different techniques can be used to combine document embeddings and label embeddings. In some embodiments, the document embedding model 211 is used to generate a document embedding for each of M documents document having a given label X, those M document embeddings are combined (e.g., by averaging), and the combined document embedding is further combined with the label embedding for label X (e.g., using concatenation). For example, if an input document set has 50 documents with a given label, the document embeddings for those 50 documents are first combined together and then with the corresponding label embedding to generate a single input to the clustering 110 process. In other embodiments, the document embedding model 211 is used to generate a document embedding for each of M documents document having a given label X and each of those M document embeddings is separately combined with the label embedding for label X (e.g., using concatenation). For example, using the input document with 50 documents having a given label, the document embeddings for those 50 documents would be separately combined with the corresponding label embedding to generate 50 inputs to the clustering 110 process.

Note that in some embodiments, the label embeddings may be omitted and instead the document embeddings can form an input to the clustering 110 process. For example, each of the document embeddings corresponding to documents having a given label can be combined to create an embedding representative of that label (but without using the label text itself as an input). Those document-based label representations can form the input to the clustering 110 process.

Note that the preprocessing can be performed by a preliminary stage in the clustering 110 process or by another process upstream of the clustering 110 process (not shown in FIG. 1).

Figure 3:
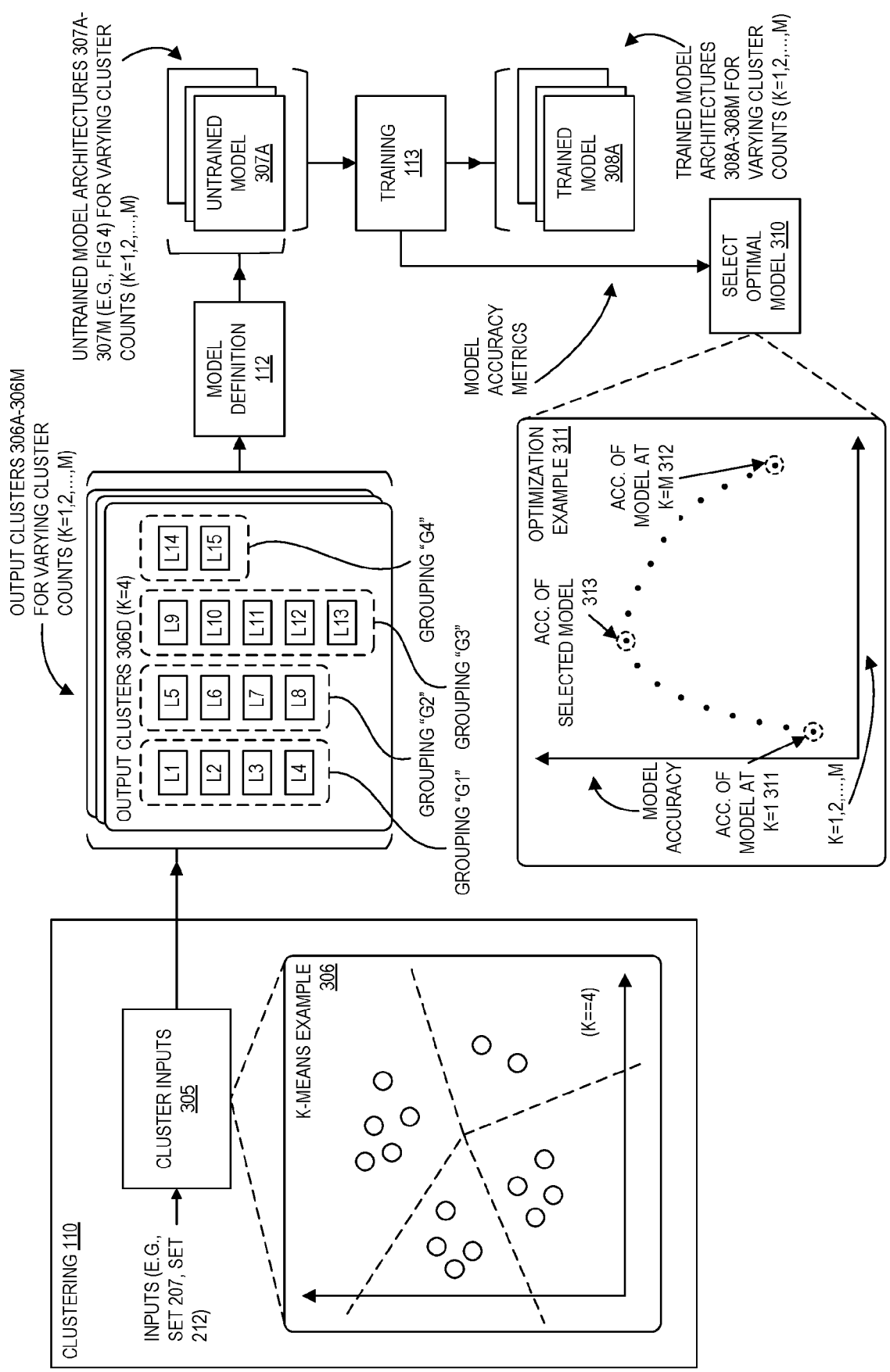
FIG. 3 illustrates example clustering and cluster optimizing operations according to some embodiments.

FIG. 3 illustrates example clustering and cluster optimizing operations according to some embodiments. As illustrated, the clustering 110 process includes a cluster inputs 305 process to generate output clusters (or groupings) 306A-306M for different numbers of clusters (e.g., grouping the inputs into two groups, three groups, four groups, etc.). The model definition 112 process defines untrained models 307A-307M corresponding to the output clusters 306A-306M. The training 113 process trains the one or more untrained models 307A-307M to generate corresponding trained models 308A-308M. A select optimal model 310 process compares the performance of the various trained models 308A-308M to select a particular model to be used for downstream inference tasks (e.g., by the classification 115 process).

The cluster inputs 305 process generates output clusters (or groupings) 306A-306M for different numbers of clusters (e.g., grouping the inputs into two groups, three groups, four groups, etc.). For example, the cluster inputs 305 process can cluster the inputs (e.g., from set 207, set 212) such as by using the k-means clustering algorithm or other clustering techniques known to one of skill in the art. In the k-means case, the algorithm can be executed for each value of k from 1 to M where M is the number of labels in the set of labels. In some embodiments, the range of k may be trimmed (e.g., from 2 to M, from 2 to M-1, from 1 to M-3). Note that the case of k=1 corresponds to a single group, equivalent to a single multi-label classifier for all labels, and the case of k=M corresponds to a separate group for each label, equivalent to the separate discriminatory classifier for each label. K-means example 306 is illustrative where the individual circles represent inputs (projected into two-dimensions).

Note that the inputs (e.g., label embeddings 207, combined label and documents embeddings 212) can be associated with the closest cluster mean based on distance (e.g., cosine similarity, Euclidean distance). For example, output clusters 306D (for k=4) are shown, where the labels L1 through L4 are grouped in cluster or group referred to here as "G1," L5 through L8 are grouped to "G2," L9 through L13 are grouped to "G3," and L14 and L15 are grouped to "G4."

Figure 4:
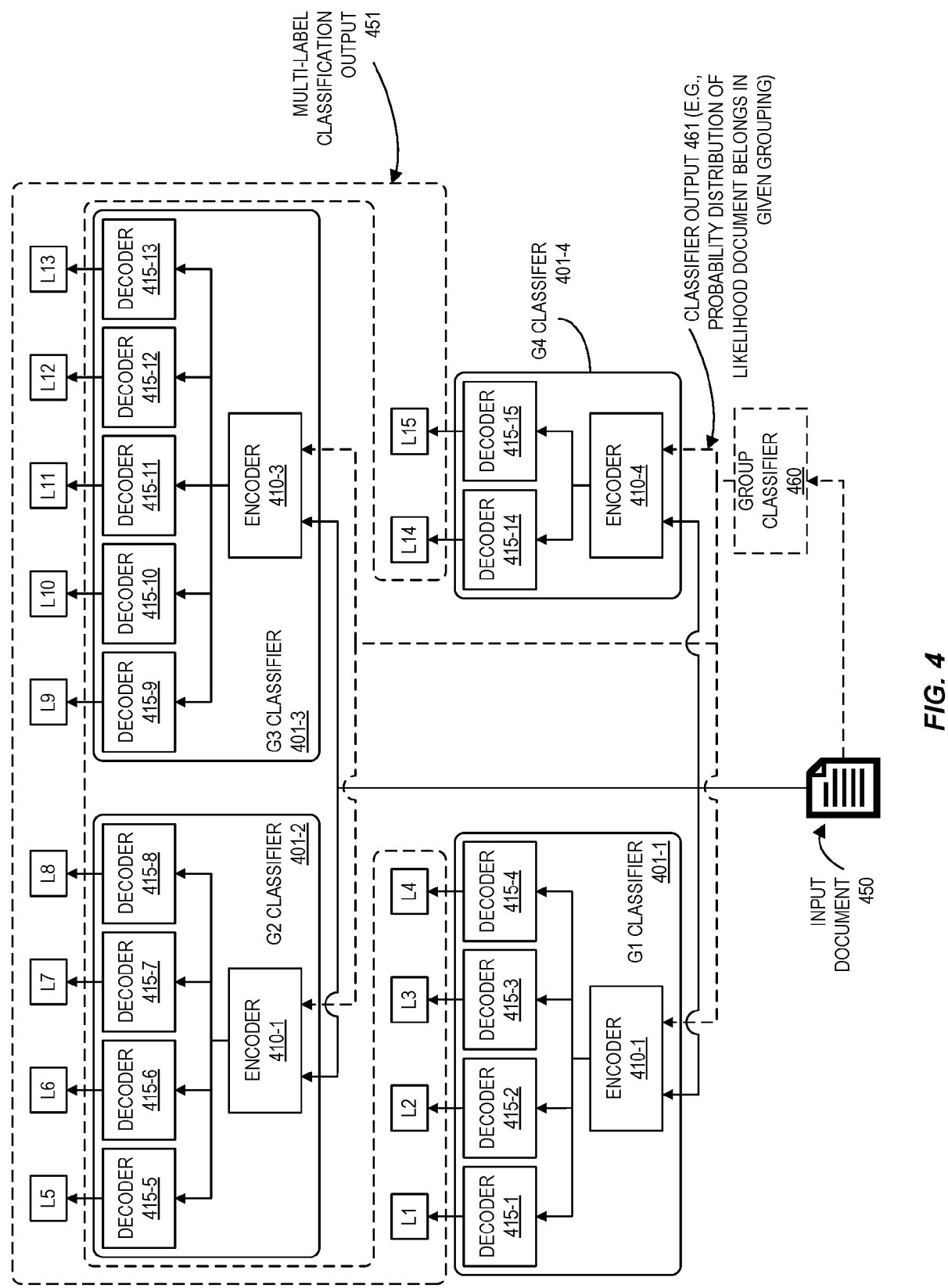
FIG. 4 illustrates example multi-label document classifier models according to some embodiments.

The model definition 112 process creates or defines untrained models 307A-307M corresponding to each of the different numbers of clusters (e.g., a model 307A based on the grouping 306A). For example, the untrained model 307D would correspond to a model based on the output clusters 306D that includes the four groupings G1 through G4, as illustrated. As noted above, the model definition 112 process can define the model using a structured format (e.g., JavaScript Object Notation, XML) or in code (e.g., Python). An exemplary model 307 architecture for a particular clustering 306D is illustrated in FIG. 4. The model can include a plurality of parameters (e.g., model weights, biases, etc.). Such parameters may be randomly initialized for training.

The training 113 process trains the untrained models 307A-307M to output trained models 308A-308M. At a high level, the training 113 process iteratively processes inputs with the model to generate model outputs, determines the error between the model outputs and the known outputs, and adjusts the model parameters. For example, a given document can be processed with model 307A. Model 307A can output a multi-label classification vector (e.g., a probability distribution across all possible labels). That vector can be compared against the actual known classification vector to compute an error which can be used to refine the model parameters (e.g., using backpropagation).

The select optimal model 310 process can select the model exhibiting the highest performance for use during the classification 115 process. For example, the trained models 308A-308M can be scored in their evaluation of a validation document set (e.g., a document set that includes known labels but was not used for training). A variety of metrics can be used to score the performance of the models 308A-308M. For example, an F1 score or other metric known to one of skill in the art can be used to score each models classification accuracy. The model having the highest accuracy can be used for subsequent classification tasks (e.g., by the classification 115 process).

The selection of the best model is illustrated graphically in optimization example 311. The illustrated plot includes a horizontal axis representing a number of clusters (e.g., from 1 to M) and a vertical axis representing the accuracy or score of the model (here, a higher score is indicative of a better model). In this example, the plotted accuracy scores form somewhat of a parabola where the accuracy for a single cluster 311 and for a maximum number of clusters 312 is worse than the accuracy for some number of clusters between those two extremes. In this case, the model exhibiting the accuracy 313 is the "best" model.

Note that in other embodiments, the training 113 process can be simplified by selecting a model architecture based on clustering error rather than model performance. For example, the cluster inputs 305 process can generate a score for each of the output clusters 306A-306M. For example, the score may be based on the distances each cluster mean and its respective input embedding in the cluster. Note that since the score likely trends toward perfect (e.g., when the number of clusters matches the number of input embeddings, the distance between each is zero), a technique such as the elbow method can be used to select the number of clusters based on a tradeoff between the increasing number of clusters and associated score (e.g., near where the score plateaus for increasing cluster counts).

FIG. 4 illustrates example multi-label document classifier models according to some embodiments. The model architecture includes a classifier for each group or cluster of labels. In some embodiments, the classifiers have an encoder-decoder architecture in which an encoder 410 generates a representation of an input document 450, and a decoder 415 corresponding to each label in the group of labels handled by the classifier evaluates the representation of the input document 450 to indicate whether the label should be attributed to the document. For example, the decoder 415-1 can output a "1" when it determines the label "L1" should be applied to a given input document and a "0" otherwise. Together, the outputs from each of the decoders form the multi-label classification output 451 of the model.

Continuing the example in which the number of selected groups or clusters was four, the model includes a classifier 401 for each group. Classifier 401-1 classifies documents with labels in group G1, classifier 401-2 classifies documents with labels in group G2, classifier 401-3 classifies documents with labels in group G3, and classifier 401-4 classifies documents with labels in group G4. Assuming an encoder-decoder architecture, the encoder 410-1 and decoders 415-1 through 415-4 form the classifier 401-1, the encoder 410-2 and decoders 415-5 through 415-8 form the classifier 401-2, the encoder 410-3 and decoders 415-9 through 415-13 form the classifier 401-3, the encoder 410-4 and decoders 415-14 and 415-15 form the classifier 401-4.

Note that because each document is provided to the classifier for each group, some documents that should not include any labels within the group might nevertheless be provided a label by the group classifier. To avoid this scenario, some embodiments can include a hierarchical classifier architecture in which an initial "group" classifier 460 can provide information to the classifiers for the different groups indicative of whether the document is part of those classifiers' respective group. The group classifier can output a probability distribution that indicates whether a document is to be associated with the labels of each of the classifiers 401. In some embodiments, the classifiers 401 can ignore documents that do not have a group probability greater than a threshold. For example, if the group classifier 460 predicts the probability that a certain document is within certain groups as G1=0.1, G2=0.5, G3=0.4, and G4=0.0, the classifier 401-1 for group G1 and the classifier 401-4 for group G4 may output a label prediction that indicates none of their labels should be applied to the document (e.g., labels L1 through L4, L14, L15).

The classifiers 410 and 460 can be implemented using various neural network architectures known to those skilled in the art. For example, the encoders 410 can be implemented as convolutional neural networks (CNNs) or recurrent neural networks (RNNs) such as using long short-term memory networks (LSTM), gated recurrent unit networks (GRU), transformer networks, and the like. The decoders 415 can likewise be implemented as CNNS or RNNs such as sigmoidal decoders, two-class decoders, and the like.

Note that additional (or fewer) stages may exist before, between, or after the illustrated encoder-decoder based classifier 410 architecture. For example, the output of an encoder 410 can be processed with a downsampling stage (e.g., by averaging, maxpooling) before being used as an input to the corresponding decoder(s) 415. Accordingly, other sets of layers and/or sequence of layers than what is illustrated may be implemented without departing from the disclosure.

In embodiments that include the hierarchical classifier architecture (e.g., including group classifier 460), the group classifier can be trained independent of the other classifiers for the groups. The training can include inputting documents in the training data set and comparing their output against a group vector that represents an abstraction of the label vector that is associated with the document. For example, if the label vector for a particular document included labels L1, L3, L10, and L11, the corresponding group vector would include groups G1 and G3 (since L1 and L3 are part of G1 and L10 and L11 are part of group G3).

Although the various processes and stages (e.g., clustering 110, model definition 112, training 113, classification 115, encoders 410, decoders 415, etc.) have been described as implemented in software (e.g., instructions executed by a processor of the computer system(s) 107), in some embodiments all or portions of the processes may be implemented in hardware such as by using application specific integrated circuits, field-programmable gate arrays, etc.

Figure 5:
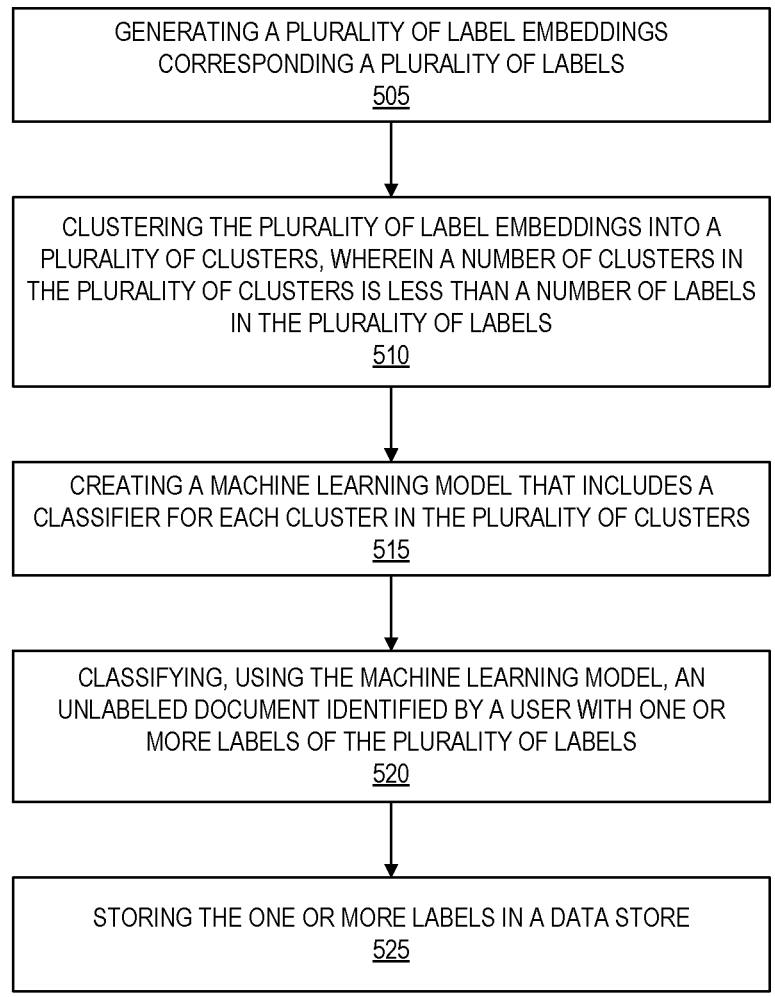
FIG. 5 is a flow diagram illustrating operations of a method for multi-label document classification according to some embodiments.

FIG. 5 is a flow diagram illustrating operations of a method for multi-label document classification according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by a preprocessing process, the clustering 110 process, the model definition 112 process, and/or the classification 115 process of the other figures.

The operations include, at block 505, generating a plurality of label embeddings corresponding a plurality of labels. For example, as described with reference to the examples illustrated in FIG. 2, the clustering 110 process or an upstream preprocessing process can create label embeddings representing the labels to be applied to a set of documents. For example, the process can generate a length 50 vector label embedding for each label using a pre-trained word embeddings model. In some embodiments, the label embeddings may be formed from a combined label embedding per label with a document embedding from a document having that label, as described with reference to example 210. In some embodiments, a label embedding for a given label can be represented by embeddings from the set of documents having that label (e.g., combining the document embeddings for the documents having a given label without using the label text to form all or part of the embedding).

The operations include, at block 510, clustering the plurality of label embeddings into a plurality of clusters, wherein a number of clusters in the plurality of clusters is less than a number of labels in the plurality of labels. For example, as described with reference to FIG. 3, the clustering 110 process can take the label embeddings (whether based on labels or combined with document embeddings and generate clusters for different numbers of clusters (e.g., using k-means clustering).

The operations include, at block 515, creating a machine learning model that includes a classifier for each cluster in the plurality of clusters. As described herein, the model definition 112 process can create models for one or more clusters. An exemplary such machine learning model can be specified using a structured format (e.g., using the Python language) to describe a neural network with connectivity as shown in FIG. 4. In particular, the model can include a classifier for each of the clusters output from clustering. The classifiers can have an encoder-decoder architecture, where the classifier for each cluster includes an encoder to generate a representation of the unlabeled document and, for each label corresponding to a label embedding in the cluster, a decoder to classify the representation of the unlabeled document with the label.

In some embodiments, the model can further include a group classifier (e.g., the group classifier 460) to provide an indication of whether the unlabeled document belongs to the given cluster to the corresponding classifier.

In some embodiments, the operations can further include training a set of parameters of each classifier using a training document set. The training document can include a plurality of training documents and, for each document, an associated one or more labels from the plurality of labels.

The operations include, at block 520, classifying, using the machine learning model, an unlabeled document identified by a user with one or more labels of the plurality of labels. As described herein, the classification 115 process can apply one or more labels to an input document by processing the input document with the created model.

The operations include, at block 525, storing the one or more labels in a data store. As described above, the output of the model can store the label(s) applied to an input document in a memory, such as a volatile or non-volatile memory. For example, the outputs can be stored in the data store 120 as document label predictions 140.

In some embodiments, the operations can further include selecting the plurality of clusters from multiple clusters based on a metric of each of the multiple clusters (e.g., a distance metric). The plurality of clusters can be selected based on a tradeoff of the decreasing cluster error relative to an increasing number of clusters (e.g., using the elbow technique).

In some embodiments, the operations can further include selecting the machine learning model from a plurality of machine learning models such as described for the select optimal model 310 process.

Figure 6:
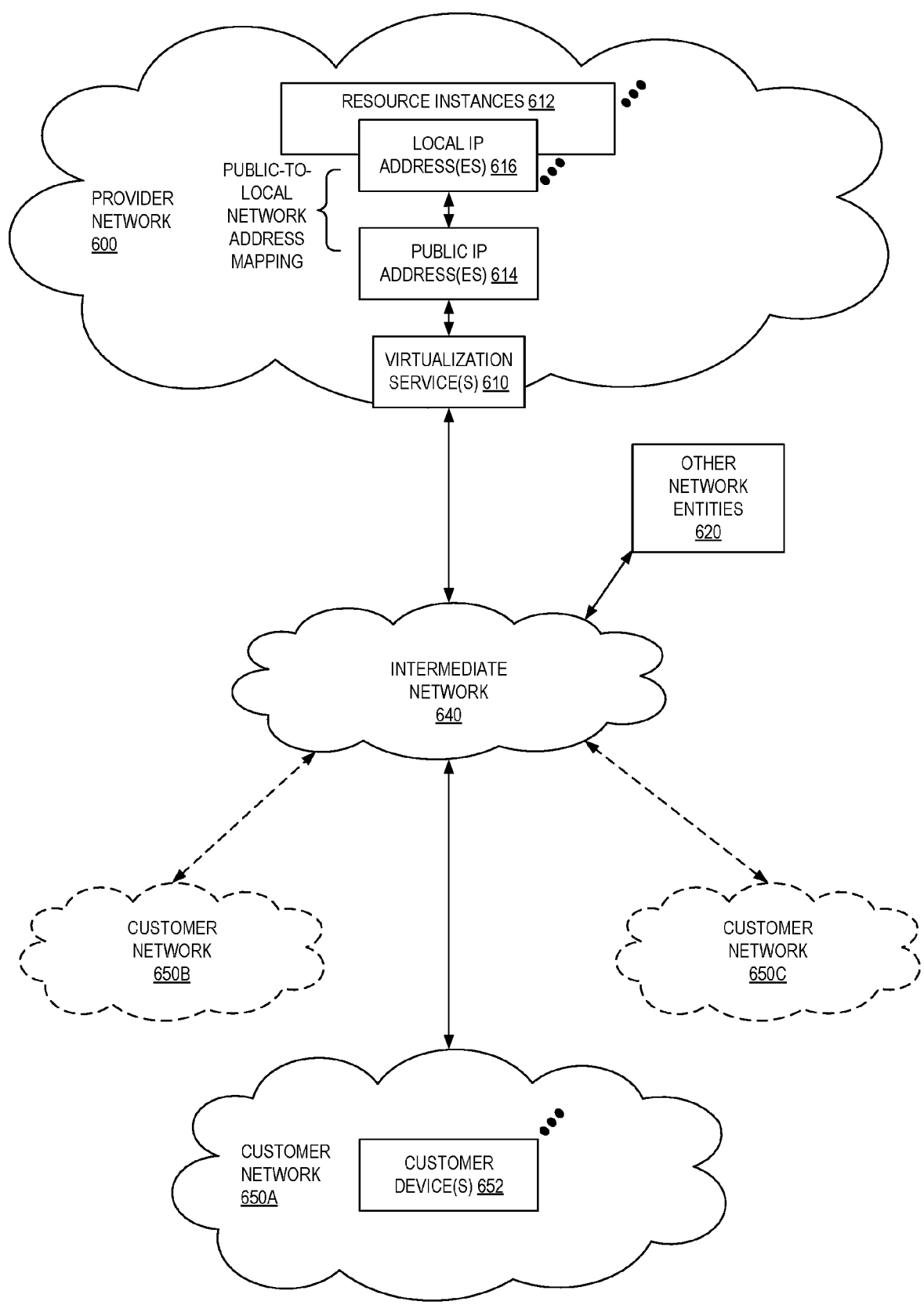
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
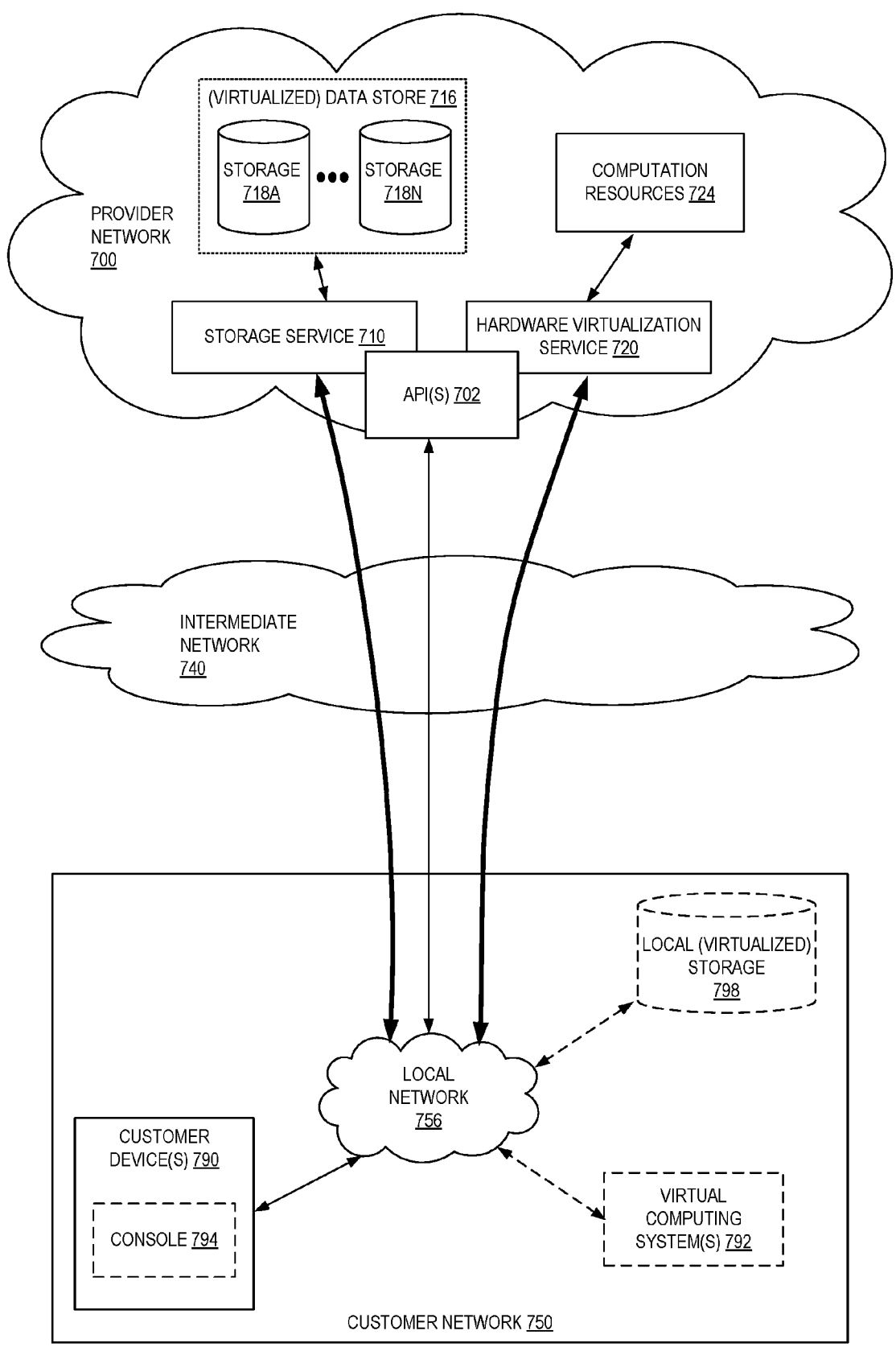
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Figure 8:
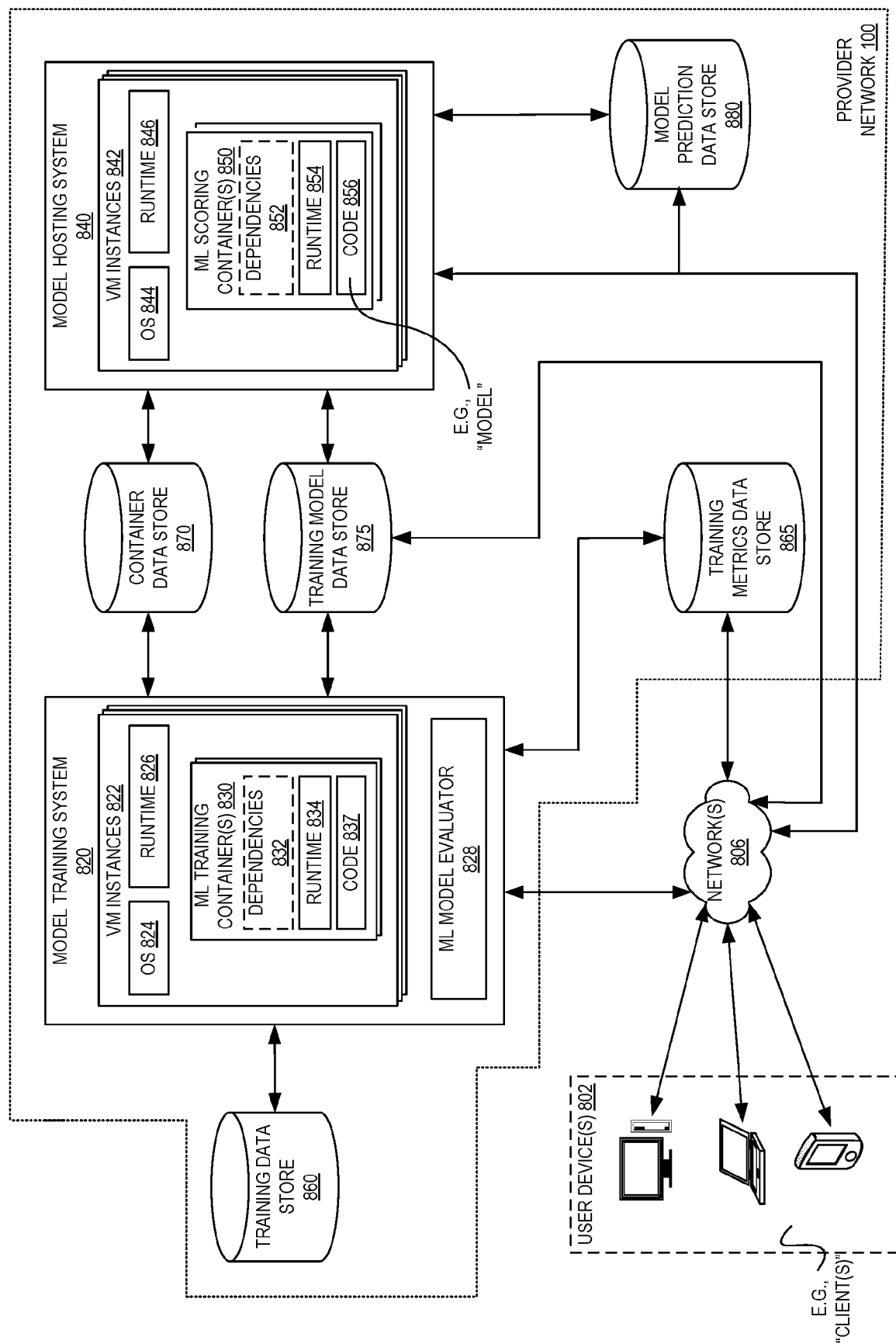
FIG. 8 is a block diagram of an illustrative operating environment in which machine learning models are trained and hosted according to some embodiments.

FIG. 8 is a block diagram of an illustrative operating environment in which machine learning models are trained and hosted according to some embodiments. The operating environment includes end user devices 802 (e.g., the electronic device devices 145), a model training system 820, a model hosting system 840, a training data store 860, a training metrics data store 865, a container data store 870, a training model data store 875, and a model prediction data store 880.

Machine learning services 105 described herein may include one or more of these entities, such as the model hosting system 840, model training system 820, and so forth.

In some embodiments, users, by way of user devices 802, interact with the model training system 820 to provide data that causes the model training system 820 to train one or more machine learning models, for example, as described elsewhere herein. A machine learning model, generally, may be thought of as one or more equations that are "trained" using a set of data. In some embodiments, the model training system 820 provides ML functionalities as a web service, and thus messaging between user devices 802 and the model training system 820 (or provider network 100), and/or between components of the model training system 820 (or provider network 100), can use HTTP messages to transfer data in a machine-readable file format, such as eXtensible Markup Language (XML) or JavaScript Object Notation (JSON). In some embodiments, providing access to various functionality as a web service is not limited to communications exchanged via the World Wide Web and more generally refers to a service that can communicate with other electronic devices via a computer network.

The user devices 802 can interact with the model training system 820 via frontend 829 of the model training system 820. For example, a user device 802 can provide a training request to the frontend 829 that includes a container image (or multiple container images, or an identifier of one or multiple locations where container images are stored), an indicator of input data (for example, an address or location of input data), one or more hyperparameter values (for example, values indicating how the algorithm will operate, how many algorithms to run in parallel, how many clusters into which to separate data, and so forth), and/or information describing the computing machine on which to train a machine learning model (for example, a graphical processing unit (GPU) instance type, a central processing unit (CPU) instance type, an amount of memory to allocate, a type of virtual machine instance to use for training, and so forth).

In some embodiments, the container image can include one or more layers, where each layer represents an executable instruction. Some or all of the executable instructions together represent an algorithm that defines a machine learning model. The executable instructions (for example, the algorithm) can be written in any programming language (for example, Python, Ruby, C++, Java, etc.). In some embodiments, the algorithm is pre-generated and obtained by a user, via the user device 802, from an algorithm repository (for example, a network-accessible marketplace, a data store provided by a machine learning training service, etc.). In some embodiments, the algorithm is completely user-generated or partially user-generated (for example, user-provided code modifies or configures existing algorithmic code).

In some embodiments, instead of providing a container image (or identifier thereof) in the training request, the user device 802 may provide, in the training request, an algorithm written in any programming language. The model training system 820 then packages the algorithm into a container (optionally with other code, such as a "base" ML algorithm supplemented with user-provided code) that is eventually loaded into a virtual machine instance 822 for training a machine learning model, as described in greater detail below. For example, a user, via a user device 802, may develop an algorithm/code using an application (for example, an interactive web-based programming environment) and cause the algorithm/code to be provided — perhaps as part of a training request (or referenced in a training request) — to the model training system 820, where this algorithm/code may be containerized on its own or used together with an existing container having a machine learning framework, for example.

In some embodiments, instead of providing a container image in the training request, the user device 802 provides, in the training request, an indicator of a container image (for example, an indication of an address or a location at which a container image is stored). For example, the container image can be stored in a container data store 870, and this container image may have been previously created/uploaded by the user. The model training system 820 can retrieve the container image from the indicated location and create a container using the retrieved container image. The container is then loaded into a virtual machine instance 822 for training a machine learning model, as described in greater detail below.

The model training system 820 can use the information provided by the user device 802 to train a machine learning model in one or more pre-established virtual machine instances 822 in some embodiments. In particular, the model training system 820 includes a single physical computing device or multiple physical computing devices that are interconnected using one or more computing networks (not shown), where the physical computing device(s) host one or more virtual machine instances 822. The model training system 820 can handle the acquisition and configuration of compute capacity (for example, containers, instances, etc., which are described in greater detail below) based on the information describing the computing machine on which to train a machine learning model provided by the user device 802. The model training system 820 can then train machine learning models using the compute capacity, as is described in greater detail below. The model training system 820 can automatically scale up and down based on the volume of training requests received from user devices 802 via frontend 829, thereby relieving the user from the burden of having to worry about over-utilization (for example, acquiring too little computing resources and suffering performance issues) or under-utilization (for example, acquiring more computing resources than necessary to train the machine learning models, and thus overpaying).

In some embodiments, the virtual machine instances 822 are utilized to execute tasks. For example, such tasks can include training a machine learning model. As shown in FIG. 8, each virtual machine instance 822 includes an operating system (OS) 824, a language runtime 826, and one or more ML training containers 830. Generally, the ML training containers 830 are logical units created within a virtual machine instance using the resources available on that instance and can be utilized to isolate execution of a task from other processes (for example, task executions) occurring in the instance. In some embodiments, the ML training containers 830 are formed from one or more container images and a top container layer. Each container image may further include one or more image layers, where each image layer represents an executable instruction. As described above, some or all of the executable instructions together represent an algorithm that defines a machine learning model. Changes made to the ML training containers 830 (for example, creation of new files, modification of existing files, deletion of files, etc.) are stored in the top container layer. If a ML training container 830 is deleted, the top container layer is also deleted. However, the container image(s) that form a portion of the deleted ML training container 830 can remain unchanged. The ML training containers 830 can be implemented, for example, as Linux containers (LXC), Docker containers, and the like.

The ML training containers 830 may include individual a runtime 834, code 837, and dependencies 832 needed by the code 837 in some embodiments. The runtime 834 can be defined by one or more executable instructions that form at least a portion of a container image that is used to form the ML training container 830 (for example, the executable instruction(s) in the container image that define the operating system and/or runtime to run in the container formed from the container image). The code 837 includes one or more executable instructions that form at least a portion of a container image that is used to form the ML training container 830. For example, the code 837 includes the executable instructions in the container image that represent an algorithm that defines a machine learning model, which may reference (or utilize) code or libraries from dependencies 832. The runtime 834 is configured to execute the code 837 in response to an instruction to begin machine learning model training. Execution of the code 837 results in the generation of model data, as described in greater detail below.

In some embodiments, the code 837 includes executable instructions that represent algorithms that define different machine learning models. For example, the code 837 includes one set of executable instructions that represent a first algorithm that defines a first machine learning model and a second set of executable instructions that represent a second algorithm that defines a second machine learning model. In some embodiments, the virtual machine instance 822 executes the code 837 and trains all of the machine learning models. In some embodiments, the virtual machine instance 822 executes the code 837, selecting one of the machine learning models to train. For example, the virtual machine instance 822 can identify a type of training data indicated by the training request and select a machine learning model to train (for example, execute the executable instructions that represent an algorithm that defines the selected machine learning model) that corresponds with the identified type of training data.

In some embodiments, the runtime 834 is the same as the runtime 826 utilized by the virtual machine instance 822. In some embodiments, the runtime 834 is different than the runtime 826 utilized by the virtual machine instance 822.

In some embodiments, the model training system 820 uses one or more container images included in a training request (or a container image retrieved from the container data store 870 in response to a received training request) to create and initialize a ML training container 830 in a virtual machine instance 822. For example, the model training system 820 creates a ML training container 830 that includes the container image(s) and/or a top container layer.

Prior to beginning the training process, in some embodiments, the model training system 820 retrieves training data from the location indicated in the training request. For example, the location indicated in the training request can be a location in the training data store 860. Thus, the model training system 820 retrieves the training data from the indicated location in the training data store 860. In some embodiments, the model training system 820 does not retrieve the training data prior to beginning the training process. Rather, the model training system 820 streams the training data from the indicated location during the training process. For example, the model training system 820 can initially retrieve a portion of the training data and provide the retrieved portion to the virtual machine instance 822 training the machine learning model. Once the virtual machine instance 822 has applied and used the retrieved portion or once the virtual machine instance 822 is about to use all of the retrieved portion (for example, a buffer storing the retrieved portion is nearly empty), then the model training system 820 can retrieve a second portion of the training data and provide the second retrieved portion to the virtual machine instance 822, and so on.

To perform the machine learning model training, the virtual machine instance 822 executes code 837 stored in the ML training container 830 in some embodiments. For example, the code 837 includes some or all of the executable instructions that form the container image of the ML training container 830 initialized therein. Thus, the virtual machine instance 822 executes some or all of the executable instructions that form the container image of the ML training container 830 initialized therein to train a machine learning model. The virtual machine instance 822 executes some or all of the executable instructions according to the hyperparameter values included in the training request. As an illustrative example, the virtual machine instance 822 trains a machine learning model by identifying values for certain parameters (for example, coefficients, weights, centroids, etc.). The identified values depend on hyperparameters that define how the training is performed. Thus, the virtual machine instance 822 can execute the executable instructions to initiate a machine learning model training process, where the training process is run using the hyperparameter values included in the training request. Execution of the executable instructions can include the virtual machine instance 822 applying the training data retrieved by the model training system 820 as input parameters to some or all of the instructions being executed.

In some embodiments, executing the executable instructions causes the virtual machine instance 822 (for example, the ML training container 830) to generate model data. For example, the ML training container 830 generates model data and stores the model data in a file system of the ML training container 830. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 830 such that the model data is written to the top container layer of the ML training container 830 and/or the container image(s) that forms a portion of the ML training container 830 is modified to include the model data.

The virtual machine instance 822 (or the model training system 820 itself) pulls the generated model data from the ML training container 830 and stores the generated model data in the training model data store 875 in an entry associated with the virtual machine instance 822 and/or the machine learning model being trained. In some embodiments, the virtual machine instance 822 generates a single file that includes model data and stores the single file in the training model data store 875. In some embodiments, the virtual machine instance 822 generates multiple files during the course of training a machine learning model, where each file includes model data. In some embodiments, each model data file includes the same or different model data information (for example, one file identifies the structure of an algorithm, another file includes a list of coefficients, etc.). The virtual machine instance 822 can package the multiple files into a single file once training is complete and store the single file in the training model data store 875. Alternatively, the virtual machine instance 822 stores the multiple files in the training model data store 875. The virtual machine instance 822 stores the file(s) in the training model data store 875 while the training process is ongoing and/or after the training process is complete.

In some embodiments, the virtual machine instance 822 regularly stores model data file(s) in the training model data store 875 as the training process is ongoing. Thus, model data file(s) can be stored in the training model data store 875 at different times during the training process. Each set of model data files corresponding to a particular time or each set of model data files present in the training model data store 875 as of a particular time could be checkpoints that represent different versions of a partially-trained machine learning model during different stages of the training process. Accordingly, before training is complete, a user, via the user device 802 can submit a deployment and/or execution request in a manner as described below to deploy and/or execute a version of a partially trained machine learning model (for example, a machine learning model trained as of a certain stage in the training process). A version of a partially-trained machine learning model can be based on some or all of the model data files stored in the training model data store 875.

In some embodiments, a virtual machine instance 822 executes code 837 stored in a plurality of ML training containers 830. For example, the algorithm included in the container image can be in a format that allows for the parallelization of the training process. Thus, the model training system 820 can create multiple copies of the container image provided in a training request and cause the virtual machine instance 822 to load each container image copy in a separate ML training container 830. The virtual machine instance 822 can then execute, in parallel, the code 837 stored in the ML training containers 830. The virtual machine instance 822 can further provide configuration information to each ML training container 830 (for example, information indicating that N ML training containers 830 are collectively training a machine learning model and that a particular ML training container 830 receiving the configuration information is ML training container 830 number X of N), which can be included in the resulting model data. By parallelizing the training process, the model training system 820 can significantly reduce the training time in some embodiments.

In some embodiments, a plurality of virtual machine instances 822 execute code 837 stored in a plurality of ML training containers 830. For example, the resources used to train a particular machine learning model can exceed the limitations of a single virtual machine instance 822. However, the algorithm included in the container image can be in a format that allows for the parallelization of the training process. Thus, the model training system 820 can create multiple copies of the container image provided in a training request, initialize multiple virtual machine instances 822, and cause each virtual machine instance 822 to load a container image copy in one or more separate ML training containers 830. The virtual machine instances 822 can then each execute the code 837 stored in the ML training containers 830 in parallel. The model training system 820 can further provide configuration information to each ML training container 830 via the virtual machine instances 822 (for example, information indicating that N ML training containers 830 are collectively training a machine learning model and that a particular ML training container 830 receiving the configuration information is ML training container 830 number X of N, information indicating that M virtual machine instances 822 are collectively training a machine learning model and that a particular ML training container 830 receiving the configuration information is initialized in virtual machine instance 822 number Y of M, etc.), which can be included in the resulting model data. As described above, by parallelizing the training process, the model training system 820 can significantly reduce the training time in some embodiments.

In some embodiments, the model training system 820 includes a plurality of physical computing devices and two or more of the physical computing devices hosts one or more virtual machine instances 822 that execute the code 837. Thus, the parallelization can occur over different physical computing devices in addition to over different virtual machine instances 822 and/or ML training containers 830.

In some embodiments, the model training system 820 includes a ML model evaluator 828. The ML model evaluator 828 can monitor virtual machine instances 822 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (for example, a level of confidence that the accuracy of the machine learning model being trained is known, etc. The ML model evaluator 828 can obtain the model data for a machine learning model being trained and evaluation data from the training data store 860. The evaluation data is separate from the data used to train a machine learning model and includes both input data and expected outputs (for example, known results), and thus the ML model evaluator 828 can define a machine learning model using the model data and execute the machine learning model by providing the input data as inputs to the machine learning model. The ML model evaluator 828 can then compare the outputs of the machine learning model to the expected outputs and determine one or more quality metrics of the machine learning model being trained based on the comparison (for example, the error rate can be a difference or distance between the machine learning model outputs and the expected outputs).

The ML model evaluator 828 periodically generates model metrics during the training process and stores the model metrics in the training metrics data store 865 in some embodiments. While the machine learning model is being trained, a user, via the user device 802, can access and retrieve the model metrics from the training metrics data store 865. The user can then use the model metrics to determine whether to adjust the training process and/or to stop the training process. For example, the model metrics can indicate that the machine learning model is performing poorly (for example, has an error rate above a threshold value, has a statistical distribution that is not an expected or desired distribution (for example, not a binomial distribution, a Poisson distribution, a geometric distribution, a normal distribution, Gaussian distribution, etc.), has an execution latency above a threshold value, has a confidence level below a threshold value)) and/or is performing progressively worse (for example, the quality metric continues to worsen over time). In response, in some embodiments, the user, via the user device 802, can transmit a request to the model training system 820 to modify the machine learning model being trained (for example, transmit a modification request). The request can include a new or modified container image, a new or modified algorithm, new or modified hyperparameter(s), and/or new or modified information describing the computing machine on which to train a machine learning model. The model training system 820 can modify the machine learning model accordingly. For example, the model training system 820 can cause the virtual machine instance 822 to optionally delete an existing ML training container 830, create and initialize a new ML training container 830 using some or all of the information included in the request, and execute the code 837 stored in the new ML training container 830 to restart the machine learning model training process. As another example, the model training system 820 can cause the virtual machine instance 822 to modify the execution of code stored in an existing ML training container 830 according to the data provided in the modification request. In some embodiments, the user, via the user device 802, can transmit a request to the model training system 820 to stop the machine learning model training process. The model training system 820 can then instruct the virtual machine instance 822 to delete the ML training container 830 and/or to delete any model data stored in the training model data store 875.

As described below, in some embodiments, the model data stored in the training model data store 875 is used by the model hosting system 840 to deploy machine learning models. Alternatively or additionally, a user device 802 or another computing device (not shown) can retrieve the model data from the training model data store 875 to implement a learning algorithm in an external device. As an illustrative example, a robotic device can include sensors to capture input data. A user device 802 can retrieve the model data from the training model data store 875 and store the model data in the robotic device. The model data defines a machine learning model. Thus, the robotic device can provide the captured input data as an input to the machine learning model, resulting in an output. The robotic device can then perform an action (for example, move forward, raise an arm, generate a sound, etc.) based on the resulting output.

While the virtual machine instances 822 are shown in FIG. 8 as a single grouping of virtual machine instances 822, some embodiments of the present application separate virtual machine instances 822 that are actively assigned to execute tasks from those virtual machine instances 822 that are not actively assigned to execute tasks. For example, those virtual machine instances 822 actively assigned to execute tasks are grouped into an "active pool," while those virtual machine instances 822 not actively assigned to execute tasks are placed within a "warming pool." In some embodiments, those virtual machine instances 822 within the warming pool can be pre-initialized with an operating system, language runtimes, and/or other software required to enable rapid execution of tasks (for example, rapid initialization of machine learning model training in ML training container(s) 830) in response to training requests.

In some embodiments, the model training system 820 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 802, the model hosting system 840, etc.). The processing unit can also communicate to and from a memory of a virtual machine instance 822 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 840 includes a single physical computing device or multiple physical computing devices that are interconnected using one or more computing networks (not shown), where the physical computing device(s) host one or more virtual machine instances 842. The model hosting system 840 can handle the acquisition and configuration of compute capacity (for example, containers, instances, etc.) based on demand for the execution of trained machine learning models. The model hosting system 840 can then execute machine learning models using the compute capacity, as is described in greater detail below. The model hosting system 840 can automatically scale up and down based on the volume of execution requests received from user devices 802 via frontend 849 of the model hosting system 840, thereby relieving the user from the burden of having to worry about over-utilization (for example, acquiring too little computing resources and suffering performance issues) or under-utilization (for example, acquiring more computing resources than necessary to run the machine learning models, and thus overpaying).

In some embodiments, the virtual machine instances 842 are utilized to execute tasks. For example, such tasks can include executing a machine learning model. As shown in FIG. 8, each virtual machine instance 842 includes an operating system (OS) 844, a language runtime 846, and one or more ML scoring containers 850. The ML scoring containers 850 are similar to the ML training containers 830 in that the ML scoring containers 850 are logical units created within a virtual machine instance using the resources available on that instance and can be utilized to isolate execution of a task from other processes (for example, task executions) occurring in the instance. In some embodiments, the ML scoring containers 850 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 850 (for example, creation of new files, modification of existing files, deletion of files, etc.) are stored in the top container layer. If a ML scoring container 850 is deleted, the top container layer is also deleted. However, the container image(s) that form a portion of the deleted ML scoring container 850 can remain unchanged. The ML scoring containers 850 can be implemented, for example, as Linux containers.

The ML scoring containers 850 each include a runtime 854, code 856, and dependencies 852 (for example, supporting software such as libraries) needed by the code 856 in some embodiments. The runtime 854 can be defined by one or more executable instructions that form at least a portion of a container image that is used to form the ML scoring container 850 (for example, the executable instruction(s) in the container image that define the operating system and/or runtime to run in the container formed from the container image). The code 856 includes one or more executable instructions that form at least a portion of a container image that is used to form the ML scoring container 850. For example, the code 856 includes the executable instructions in the container image that represent an algorithm that defines a machine learning model, which may reference dependencies 852. The code 856 can also include model data that represent characteristics of the defined machine learning model, as described in greater detail below. The runtime 854 is configured to execute the code 856 in response to an instruction to begin execution of a machine learning model. Execution of the code 856 results in the generation of outputs (for example, predicted results), as described in greater detail below.

In some embodiments, the runtime 854 is the same as the runtime 846 utilized by the virtual machine instance 842. In some embodiments, runtime 854 is different than the runtime 846 utilized by the virtual machine instance 842.

In some embodiments, the model hosting system 840 uses one or more container images included in a deployment request (or a container image retrieved from the container data store 870 in response to a received deployment request) to create and initialize a ML scoring container 850 in a virtual machine instance 842. For example, the model hosting system 840 creates a ML scoring container 850 that includes the container image(s) and/or a top container layer.

As described above, a user device 802 can submit a deployment request and/or an execution request to the model hosting system 840 via the frontend 849 in some embodiments. A deployment request causes the model hosting system 840 to deploy a trained machine learning model into a virtual machine instance 842. For example, the deployment request can include an identification of an endpoint (for example, an endpoint name, such as an HTTP endpoint name) and an identification of one or more trained machine learning models (for example, a location of one or more model data files stored in the training model data store 875). Optionally, the deployment request also includes an identification of one or more container images stored in the container data store 870.

Upon receiving the deployment request, the model hosting system 840 initializes ones or more ML scoring containers 850 in one or more hosted virtual machine instance 842. In embodiments in which the deployment request includes an identification of one or more container images, the model hosting system 840 forms the ML scoring container(s) 850 from the identified container image(s). For example, a container image identified in a deployment request can be the same container image used to form an ML training container 830 used to train the machine learning model corresponding to the deployment request. Thus, the code 856 of the ML scoring container(s) 850 includes one or more executable instructions in the container image(s) that represent an algorithm that defines a machine learning model. In embodiments in which the deployment request does not include an identification of a container image, the model hosting system 840 forms the ML scoring container(s) 850 from one or more container images stored in the container data store 870 that are appropriate for executing the identified trained machine learning model(s). For example, an appropriate container image can be a container image that includes executable instructions that represent an algorithm that defines the identified trained machine learning model(s).

The model hosting system 840 further forms the ML scoring container(s) 850 by retrieving model data corresponding to the identified trained machine learning model(s) in some embodiments. For example, the deployment request can identify a location of model data file(s) stored in the training model data store 875. In embodiments in which a single model data file is identified in the deployment request, the model hosting system 840 retrieves the identified model data file from the training model data store 875 and inserts the model data file into a single ML scoring container 850, which forms a portion of code 856. In some embodiments, the model data file is archived or compressed (for example, formed from a package of individual files). Thus, the model hosting system 840 unarchives or decompresses the model data file to obtain multiple individual files and inserts the individual files into the ML scoring container 850. In some embodiments, the model hosting system 840 stores the model data file in the same location as the location in which the model data file was stored in the ML training container 830 that generated the model data file. For example, the model data file initially was stored in the top container layer of the ML training container 830 at a certain offset, and the model hosting system 840 then stores the model data file in the top container layer of the ML scoring container 850 at the same offset.

In embodiments in which multiple model data files are identified in the deployment request, the model hosting system 840 retrieves the identified model data files from the training model data store 875. The model hosting system 840 can insert the model data files into the same ML scoring container 850, into different ML scoring containers 850 initialized in the same virtual machine instance 842, or into different ML scoring containers 850 initialized in different virtual machine instances 842. As an illustrative example, the deployment request can identify multiple model data files corresponding to different trained machine learning models because the trained machine learning models are related (for example, the output of one trained machine learning model is used as an input to another trained machine learning model). Thus, the user may desire to deploy multiple machine learning models to eventually receive a single output that relies on the outputs of multiple machine learning models.

In some embodiments, the model hosting system 840 associates the initialized ML scoring container(s) 850 with the endpoint identified in the deployment request. For example, each of the initialized ML scoring container(s) 850 can be associated with a network address. The model hosting system 840 can map the network address(es) to the identified endpoint, and the model hosting system 840 or another system (for example, a routing system, not shown) can store the mapping. Thus, a user device 802 can refer to trained machine learning model(s) stored in the ML scoring container(s) 850 using the endpoint. This allows for the network address of an ML scoring container 850 to change without causing the user operating the user device 802 to change the way in which the user refers to a trained machine learning model.

Once the ML scoring container(s) 850 are initialized, the ML scoring container(s) 850 are ready to execute trained machine learning model(s). In some embodiments, the user device 802 transmits an execution request to the model hosting system 840 via the frontend 849, where the execution request identifies an endpoint and includes an input to a machine learning model (for example, a set of input data). The model hosting system 840 or another system (for example, a routing system, not shown) can obtain the execution request, identify the ML scoring container(s) 850 corresponding to the identified endpoint, and route the input to the identified ML scoring container(s) 850.

In some embodiments, a virtual machine instance 842 executes the code 856 stored in an identified ML scoring container 850 in response to the model hosting system 840 receiving the execution request. In particular, execution of the code 856 causes the executable instructions in the code 856 corresponding to the algorithm to read the model data file stored in the ML scoring container 850, use the input included in the execution request as an input parameter, and generate a corresponding output. As an illustrative example, the algorithm can include coefficients, weights, layers, cluster centroids, and/or the like. The executable instructions in the code 856 corresponding to the algorithm can read the model data file to determine values for the coefficients, weights, layers, cluster centroids, and/or the like. The executable instructions can include input parameters, and the input included in the execution request can be supplied by the virtual machine instance 842 as the input parameters. With the machine learning model characteristics and the input parameters provided, execution of the executable instructions by the virtual machine instance 842 can be completed, resulting in an output.

In some embodiments, the virtual machine instance 842 stores the output in the model prediction data store 880. Alternatively or in addition, the virtual machine instance 842 transmits the output to the user device 802 that submitted the execution result via the frontend 849.

In some embodiments, the execution request corresponds to a group of related trained machine learning models. Thus, the ML scoring container 850 can transmit the output to a second ML scoring container 850 initialized in the same virtual machine instance 842 or in a different virtual machine instance 842. The virtual machine instance 842 that initialized the second ML scoring container 850 can then execute second code 856 stored in the second ML scoring container 850, providing the received output as an input parameter to the executable instructions in the second code 856. The second ML scoring container 850 further includes a model data file stored therein, which is read by the executable instructions in the second code 856 to determine values for the characteristics defining the machine learning model.

Execution of the second code 856 results in a second output. The virtual machine instance 842 that initialized the second ML scoring container 850 can then transmit the second output to the model prediction data store 880 and/or the user device 802 via the frontend 849 (for example, if no more trained machine learning models are needed to generate an output) or transmit the second output to a third ML scoring container 850 initialized in the same or different virtual machine instance 842 (for example, if outputs from one or more additional trained machine learning models are needed), and the above-referenced process can be repeated with respect to the third ML scoring container 850.

While the virtual machine instances 842 are shown in FIG. 8 as a single grouping of virtual machine instances 842, some embodiments of the present application separate virtual machine instances 842 that are actively assigned to execute tasks from those virtual machine instances 842 that are not actively assigned to execute tasks. For example, those virtual machine instances 842 actively assigned to execute tasks are grouped into an "active pool," while those virtual machine instances 842 not actively assigned to execute tasks are placed within a "warming pool." In some embodiments, those virtual machine instances 842 within the warming pool can be pre-initialized with an operating system, language runtimes, and/or other software required to enable rapid execution of tasks (for example, rapid initialization of ML scoring container(s) 850, rapid execution of code 856 in ML scoring container(s), etc.) in response to deployment and/or execution requests.

In some embodiments, the model hosting system 840 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 802, the model training system 820, etc.). The processing unit can also communicate to and from a memory of a virtual machine instance 842 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi arm bandit models, reinforcement learning models, ensemble machine learning models, deep learning models, and/or the like.

The model training system 820 and the model hosting system 840 depicted in FIG. 8 are not meant to be limiting. For example, the model training system 820 and/or the model hosting system 840 could also operate within a computing environment having a fewer or greater number of devices than are illustrated in FIG. 8. Thus, the depiction of the model training system 820 and/or the model hosting system 840 in FIG. 8 may be taken as illustrative and not limiting to the present disclosure. For example, the model training system 820 and/or the model hosting system 840 or various constituents thereof could implement various web services components, hosted or "cloud" computing environments, and/or peer-to-peer network configurations to implement at least a portion of the processes described herein. In some embodiments, the model training system 820 and/or the model hosting system 840 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 829 processes all training requests received from user devices 802 and provisions virtual machine instances 822. In some embodiments, the frontend 829 serves as a front door to all the other services provided by the model training system 820. The frontend 829 processes the requests and makes sure that the requests are properly authorized. For example, the frontend 829 may determine whether the user associated with the training request is authorized to initiate the training process.

Similarly, frontend 849 processes all deployment and execution requests received from user devices 802 and provisions virtual machine instances 842. In some embodiments, the frontend 849 serves as a front door to all the other services provided by the model hosting system 840. The frontend 849 processes the requests and makes sure that the requests are properly authorized. For example, the frontend 849 may determine whether the user associated with a deployment request or an execution request is authorized to access the indicated model data and/or to execute the indicated machine learning model.

The training data store 860 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 860 is depicted as being located external to the model training system 820 and the model hosting system 840, this is not meant to be limiting. For example, in some embodiments not shown, the training data store 860 is located internal to at least one of the model training system 820 or the model hosting system 840.

In some embodiments, the training metrics data store 865 stores model metrics. While the training metrics data store 865 is depicted as being located external to the model training system 820 and the model hosting system 840, this is not meant to be limiting. For example, in some embodiments not shown, the training metrics data store 865 is located internal to at least one of the model training system 820 or the model hosting system 840.

The container data store 870 stores container images, such as container images used to form ML training containers 830 and/or ML scoring containers 850, that can be retrieved by various virtual machine instances 822 and/or 842. While the container data store 870 is depicted as being located external to the model training system 820 and the model hosting system 840, this is not meant to be limiting. For example, in some embodiments not shown, the container data store 870 is located internal to at least one of the model training system 820 and the model hosting system 840.

The training model data store 875 stores model data files. In some embodiments, some of the model data files are comprised of a single file, while other model data files are packages of multiple individual files. While the training model data store 875 is depicted as being located external to the model training system 820 and the model hosting system 840, this is not meant to be limiting. For example, in some embodiments not shown, the training model data store 875 is located internal to at least one of the model training system 820 or the model hosting system 840.

The model prediction data store 880 stores outputs (for example, execution results) generated by the ML scoring containers 850 in some embodiments. While the model prediction data store 880 is depicted as being located external to the model training system 820 and the model hosting system 840, this is not meant to be limiting. For example, in some embodiments not shown, the model prediction data store 880 is located internal to at least one of the model training system 820 and the model hosting system 840.

While the model training system 820, the model hosting system 840, the training data store 860, the training metrics data store 865, the container data store 870, the training model data store 875, and the model prediction data store 880 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (for example, also referred to herein as a machine learning service) can communicate with one or more of the user devices 802 via the one or more network(s) 806.

Various example user devices 802 are shown in FIG. 8, including a desktop computer, laptop, and a mobile phone, each provided by way of illustration. In general, the user devices 802 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 820 and/or the model hosting system 840 provides the user devices 802 with one or more user interfaces, command-line interfaces (CLI), application programing interfaces (API), and/or other programmatic interfaces for submitting training requests, deployment requests, and/or execution requests. In some embodiments, the user devices 802 can execute a stand-alone application that interacts with the model training system 820 and/or the model hosting system 840 for submitting training requests, deployment requests, and/or execution requests.

In some embodiments, the network 806 includes any wired network, wireless network, or combination thereof. For example, the network 806 may be a personal area network, local area network, wide area network, over-the-air broadcast network (for example, for radio or television), cable network, satellite network, cellular telephone network, or combination thereof. As a further example, the network 806 may be a publicly accessible network of linked networks, possibly operated by various distinct parties, such as the Internet. In some embodiments, the network 806 may be a private or semi-private network, such as a corporate or university intranet. The network 806 may include one or more wireless networks, such as a Global System for Mobile Communications (GSM) network, a Code Division Multiple Access (CDMA) network, a Long Term Evolution (LTE) network, or any other type of wireless network. The network 806 can use protocols and components for communicating via the Internet or any of the other aforementioned types of networks. For example, the protocols used by the network 806 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 9:
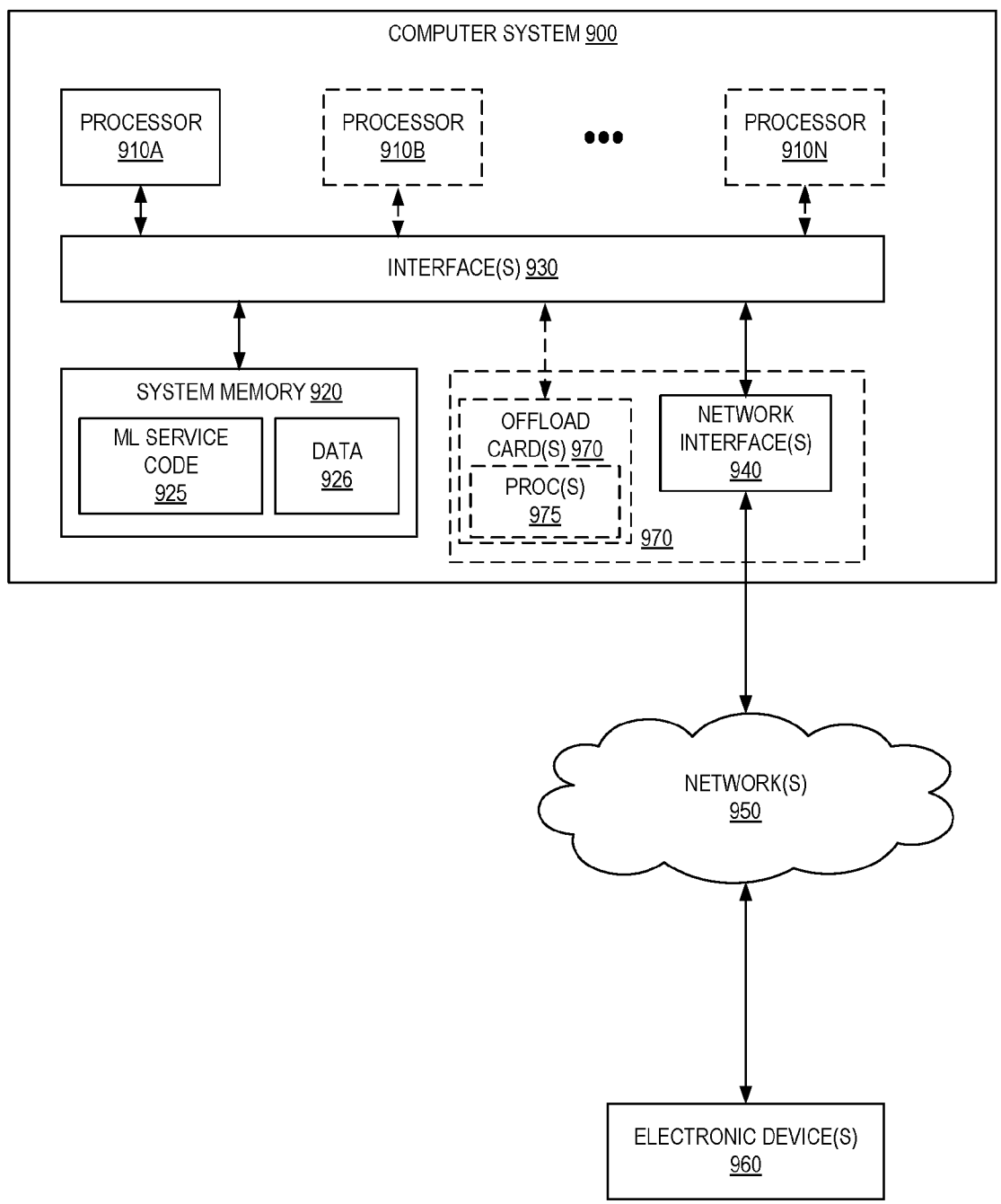
FIG. 9 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as machine learning service code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect - Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol / Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 160A-160N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
generating, by a machine learning service of a provider network, a plurality of label embeddings corresponding to a plurality of labels using a pre-trained model;
clustering the plurality of label embeddings into a plurality of clusters, wherein a number of clusters in the plurality of clusters is less than a number of labels in the plurality of labels, wherein a first cluster of the plurality of clusters corresponds to a first document class and a second cluster of the plurality of clusters corresponds to a second document class;
creating a multi-label classifier model that includes a neural network-based classifier for each cluster in the plurality of clusters, wherein the neural network-based classifier for each cluster includes an encoder to generate a representation of the unlabeled document and, for each label corresponding to a label embedding in the cluster, a decoder to classify the representation of the unlabeled document with the label;
training a set of parameters of each neural network-based classifier using a training document set, the training document set including a plurality of documents and, for each document, an associated one or more labels from the plurality of labels;
classifying, using the multi-label classifier model, an unlabeled document identified by a user with multiple labels of the plurality of labels; and
storing the one or more labels in a data store.

2. The computer-implemented method of claim 1, wherein the multi-label classifier model further includes a group classifier and further comprising:
providing, by the group classifier to the neural network-based classifier for a given cluster of the plurality of clusters, an indication of whether the unlabeled document belongs to the given cluster.

3. The computer-implemented method of claim 1, wherein the neural network-based classifier for each cluster includes an encoder to generate a fixed-length representation of the unlabeled document and, for each label corresponding to a label embedding in the cluster, a decoder to classify the fixed-length representation of the unlabeled document with the label.

4. A computer-implemented method comprising:
generating a plurality of label embeddings corresponding to a plurality of labels;
clustering the plurality of label embeddings into a plurality of clusters, wherein a number of clusters in the plurality of clusters is less than a number of labels in the plurality of labels;
creating a machine learning model that includes a neural network-based classifier for each cluster in the plurality of clusters, wherein the neural network-based classifier for each cluster includes an encoder to generate a representation of the unlabeled document and, for each label corresponding to a label embedding in the cluster, a decoder to classify the representation of the unlabeled document with the label;
training a set of parameters of each neural network-based classifier in the machine learning model using a training document set, the training document set including a plurality of documents and, for each document, an associated one or more labels from the plurality of labels;
classifying, using the machine learning model, an unlabeled document identified by a user with one or more labels of the plurality of labels; and
storing the one or more labels in a data store.

5. The computer-implemented method of claim 4, wherein the machine learning model further includes a group classifier and further comprising:
providing, by the group classifier to the neural network-based classifier for a given cluster of the plurality of clusters, an indication of whether the unlabeled document belongs to the given cluster.

6. The computer-implemented method of claim 4, wherein the clustering is performed using k-means clustering.

7. The computer-implemented method of claim 4, further comprising selecting the plurality of clusters, wherein the selecting includes:
generating a first metric based at least in part on a distance between a first label embedding in a first cluster of the plurality of clusters to a cluster mean for the first cluster;
clustering the plurality of label embeddings into another plurality of clusters, wherein a number of clusters in the other plurality of clusters is different than the number of clusters in the plurality of clusters;
generating a second metric based at least in part on a distance between a second label embedding in a second cluster of the other plurality of clusters to a cluster mean for the second cluster; and
selecting the plurality of clusters based at least in part on a comparison of the first metric to the second metric.

8. The computer-implemented method of claim 4, further comprising:
clustering the plurality of label embeddings into another plurality of clusters, wherein a number of clusters in the other plurality of clusters is different than the number of clusters in the plurality of clusters;
creating another machine learning model that includes a neural network-based classifier for each cluster in the other plurality of clusters;
generating a first metric representing a classification performance of the machine learning model on a validation document set;
training a set of parameters of each neural network-based classifier in the other machine learning model using the training document set;
generating a second metric representing a classification performance of the other machine learning model on the validation document set; and
selecting the machine learning model to classify the unlabeled document based at least in part on a comparison of the first metric to the second metric.

9. The computer-implemented method of claim 4, wherein the plurality of label embeddings corresponding to the plurality of labels are generated using a pre-trained model.

10. The computer-implemented method of claim 4, further comprising:
training a set of parameters of each neural network-based classifier using a training document set, the training document set including a plurality of training documents and, for each document, an associated one or more labels from the plurality of labels.

11. The computer-implemented method of claim 10:
wherein a label embedding corresponding to a given label in the plurality of label embeddings includes a document embedding of at least one training document labeled with the given label, and
wherein the document embedding is generated using a pre-trained model.

12. A system comprising:
a first one or more electronic devices of a provider network to implement a data store; and
a second one or more electronic devices of the provider network to implement a machine learning service, the machine learning service including instructions that upon execution cause the machine learning service to:
generate a plurality of label embeddings corresponding to a plurality of labels;
cluster the plurality of label embeddings into a plurality of clusters, wherein a number of clusters in the plurality of clusters is less than a number of labels in the plurality of labels;
create a machine learning model that includes a neural network-based classifier for each cluster in the plurality of clusters, wherein the neural network-based classifier for each cluster includes an encoder to generate a representation of the unlabeled document and, for each label corresponding to a label embedding in the cluster, a decoder to classify the representation of the unlabeled document with the label;
train a set of parameters of each neural network-based classifier in the machine learning model using a training document set, the training document set including a plurality of documents and, for each document, an associated one or more labels from the plurality of labels;
classify, using the machine learning model, an unlabeled document identified by a user with one or more labels of the plurality of labels; and
store the one or more labels in the data store.

13. The system of claim 12, wherein the machine learning model further includes a group classifier, and wherein the machine learning service includes further instructions that upon execution cause the machine learning service to:
provide, by the group classifier to the neural network-based classifier for a given cluster of the plurality of clusters, an indication of whether the unlabeled document belongs to the given cluster.

14. The system of claim 12, wherein the neural network-based classifier for each cluster includes an encoder to generate a representation of the unlabeled document and, for each label corresponding to a label embedding in the cluster, a decoder to classify the representation of the unlabeled document with the label.

15. The system of claim 12, wherein the machine learning service includes further instructions that upon execution cause the machine learning service to:
   generate a first metric based at least in part on a distance between a first label embedding in a first cluster of the plurality of clusters to a cluster mean for the first cluster;
   cluster the plurality of label embeddings into another plurality of clusters, wherein a number of clusters in the other plurality of clusters is different than the number of clusters in the plurality of clusters;
   generate a second metric based at least in part on a distance between a second label embedding in a second cluster of the other plurality of clusters to a cluster mean for the second cluster; and
   select the plurality of clusters based at least in part on a comparison of the first metric to the second metric.

16. The system of claim 12, wherein the machine learning service includes further instructions that upon execution cause the machine learning service to:
   cluster the plurality of label embeddings into another plurality of clusters, wherein a number of clusters in the other plurality of clusters is different than the number of clusters in the plurality of clusters;
   create another machine learning model that includes a neural network-based classifier for each cluster in the other plurality of clusters;
   generate a first metric representing a classification performance of the machine learning model on a validation document set;
   train a set of parameters of each neural network-based classifier in the other machine learning model using the training document set;
   generate a second metric representing a classification performance of the other machine learning model on the validation document set; and
   select the machine learning model to classify the unlabeled document based at least in part on a comparison of the first metric to the second metric.

17. The system of claim 12, wherein the plurality of label embeddings corresponding to the plurality of labels are generated using a pre-trained model.

18. The system of claim 12, wherein the machine learning service includes further instructions that upon execution cause the machine learning service to:
   train a set of parameters of each neural network-based classifier using a training document set, the training document set including a plurality of training documents and, for each document, an associated one or more labels from the plurality of labels,
   wherein a label embedding corresponding to a given label in the plurality of label embeddings includes a document embedding of at least one training document labeled with the given label, and
   wherein the document embedding is generated using a pre-trained model.

* * * * *